(12) United States Patent
Sridharan (10) Patent No.: US 11,275,899 B2
(45) Date of Patent: Mar. 15, 2022

(54) GENERATING GAME ENVIRONMENTS FROM UNSTRUCTURED TEXTUAL CORPUS FOR REINFORCEMENT LEARNING

(71) Applicant: International Business Machines Corporation, Armonk, NY (US)

(72) Inventor: Srihari Sridharan, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 16/237,914

(22) Filed: Jan. 2, 2019

(65) Prior Publication Data

US 2020/0210527 A1    Jul. 2, 2020

(51) Int. Cl.
*G06F 40/00* (2020.01)
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC ........ G06N 20/00; G06N 20/20; G06N 5/003; G06N 3/02; G06N 3/0409; G06N 3/04; G06N 3/0427; G06N 3/0445; G06N 3/0454; G06N 3/0472; G06N 3/0481; G06N 3/049; G06N 3/08; G06N 3/082; G06N 3/084; G06N 3/086; G06N 3/088; G06N 7/02; G06N 7/023; G06F 40/289; G06F 40/284; G06F 40/279; G06F 40/253; G06F 40/237; G06F 40/20; G06F 40/205; G06F 40/211; G06F 40/216; G06F 40/268; G06F 40/274; G06F 40/35; G06F 40/30; G06F 9/4401; G06F 9/4403; G06F 9/4405; G06F 9/4408; G06F 9/441; G06F 9/4411; G06F 9/4415; G06F 9/4413; G06F 9/4416; G06F 9/4418
See application file for complete search history.

(56) References Cited

U.S. PATENT DOCUMENTS 7,403,904 B2    7/2008   Abe et al.
10,424,302 B2 *  9/2019   Shah ................. G06F 16/90332
10,780,351 B2 *  9/2020   Okumura .............. A63F 13/822
(Continued)

FOREIGN PATENT DOCUMENTS

WO    2018141622 A1    8/2018

OTHER PUBLICATIONS

Silver, D., Hubert, T., Schrittwieser, J., Antonoglou, I., Lai, M., Guez, A., . . . & Hassabis, D. (2017). Mastering chess and shogi by self-play with a general reinforcement learning algorithm. arXiv preprint arXiv:1712.01815. (Year: 2017).*
(Continued)

*Primary Examiner* — Edgar X Guerra-Erazo
(74) *Attorney, Agent, or Firm* — Scully, Scott, Murphy & Presser, P.C.; Shimon Benjamin (57) ABSTRACT

Representative features representing actions and states described in text corpus comprising unstructured natural language data are generated. State properties associated with the states from the representative features and action properties associated with the actions from the representative features are generated. A state transition matrix with initial configurations is generated based on the state space and action space properties. A computer environment is bootstrapped based on the state space, the action space and the initial state transition matrix.

18 Claims, 10 Drawing Sheets

(56) References Cited

U.S. PATENT DOCUMENTS

| | | | |
|---|---|---|---|
| 2013/0318023 A1 | 11/2013 | Morimura et al. | |
| 2017/0261947 A1 | 9/2017 | Koga | |
| 2018/0233128 A1* | 8/2018 | Chen | G10L 15/22 |
| 2019/0236458 A1* | 8/2019 | Taylor | G06N 5/022 |
| 2019/0336862 A1* | 11/2019 | Okumura | G06N 20/00 |
| 2019/0385087 A1* | 12/2019 | Martin-Maroto | G06N 5/043 |

OTHER PUBLICATIONS

Y. Zhang and Y. Zhou, "An unsupervised method for lexical acquisition based on Bootstrapping," 2009 International Conference on Natural Language Processing and Knowledge Engineering, 2009, pp. 1-7, doi: 10.1109/NLPKE.2009.5313737. (Year: 2009).*

Hare, J. (2019). Dealing with sparse rewards in reinforcement learning. arXiv preprint arXiv:1910.09281. (Year: 2019).*

Zelinka, M. (Nov. 2018). Baselines for reinforcement learning in text games. In 2018 IEEE 30th International Conference on Tools with Artificial Intelligence (ICTAI) (pp. 320-327). IEEE. (Year: 2018).*

He, J., et al., "Deep Reinforcement Learning with a Natural Language Action Space", Proceedings of the 54th Annual Meeting of the Association for Computational Linguistics, Aug. 7-12, 2016, pp. 1621-1630.

Choi, S., et al., "Reinforcement Learning based Recommender System using Biclustering Technique", IFUP'18, Feb. 2018, 4 pages.

Open AI, "Gym", https://gym.openai.com/, Printed on Nov. 30, 2018, 2 pages.

Git Hub, Inc., "DeepMind Lab", https://github.com/deepmind/lab, Printed on Nov. 30, 2018, 4 pages.

Git Hub, Inc., "Unity", https://github.com/Unity-Technologies/ml-agents, Printed on Nov. 30, 2018, 3 pages.

Wikipedia, "Chess piece relative value", https://en.wikipedia.org/wiki/Chess_piece_relative_value?oldformat=trues, Last edited Dec. 18, 2018, Printed on Jan. 2, 2019, 7 pages.

Chen, D., et al., "A Fast and Accurate Dependency Parser using Neural Networks", https://cs.stanford.edu/people/danqi/papers/emnlp2014.pdf, Printed on Nov. 30, 2018, 11 pages.

* cited by examiner

GENERATING GAME ENVIRONMENTS FROM UNSTRUCTURED TEXTUAL CORPUS FOR REINFORCEMENT LEARNING

BACKGROUND

The present application relates generally to computers and computer applications, and more particularly to generating game environments from unstructured textual corpus for reinforcement learning.

Reinforcement learning (RL) is a framework in sequential decision making models, where an agent interacts with an environment by performing an action at a time over many possible actions, and learns the reward that it generates over a period of time to reach a goal. In order to enable such framework to be applied, the environment has to be structured to apply various RL algorithms. Characteristics of such environments are a well-defined state space which comprises of all possible states an agent can fall into and action space which are all possible actions an agent can take.

Example applications of RL algorithms include game environments and robotics. For instance, in a game environment such as a video game environment, states may include all possible locations in the game environment, and actions can comprise of moving left, right, top, down. Often, states and actions are manually developed to be applicable for using and evaluating RL algorithms. Although the RL algorithms have improved, the space of generating environments in a scalable way from manual text records to enable such algorithms to be applied on real world decision making problems is still a novelty.

BRIEF SUMMARY

A computer-implemented method and system may be provided, which generate game environments from unstructured textual corpus for reinforcement learning. The method, in one aspect, may include receiving text corpus comprising unstructured natural language data. The method may also include generating representative features representing actions and states described in the text corpus. The method may further include extracting and characterizing state properties associated with the states from the representative features. The method may also include extracting and characterizing action properties associated with the actions from the representative features. The method may also include generating a state transition matrix with initial configurations based on the state space and action space properties. The method may further include bootstrapping a computer environment based on the state space, the action space and the initial state transition matrix.

A system, in one aspect, may include a hardware processor coupled with a memory device. The hardware processor may be operable to receive text corpus comprising unstructured natural language data. The hardware processor also may be operable to generate representative features representing actions and states described in the text corpus. The hardware processor also may be operable to extract and characterizing state properties associated with the states from the representative features. The hardware processor also may be operable to extract and characterize action properties associated with the actions from the representative features. The hardware processor also may be operable to generate a state transition matrix with initial configurations based on the state space and action space properties. The hardware processor also may be operable to bootstrap a computer environment based on the state space, the action space and the initial state transition matrix.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, and techniques are disclosed that generate text based action spaces from unstructured text records for reinforcement learning based recommender systems. In some embodiments, the system and/or method (also referred to as a methodology) transforms processes from text records into viable discrete actions, applicable to be utilized in a decision making process. In some embodiments, a methodology of the present disclosure may include parsing raw text records to a representative feature vector by implementing or using one or more natural language processing (NLP) methods; clustering the generated feature vectors of individual text records by implementing or using an unsupervised machine learning technique; optimizing for the right number of clusters (actions) in unsupervised way by implementing or using methods like Silhouette Analysis; and assigning one representative action and an action identifier (ID) to each cluster. In some embodiments, each action ID is treated as a unique possible action that can be performed by a model.

In reinforcement learning (RL) methodology, a learning agent at any state, interacts with the environment and statistically determines the value of each action. Value can increase if there is an improvement in state with respect to the goal, or vice versa. For example, the value of an action can decrease if there is no improvement in state with respect to the goal. The actions are ranked based on these values and provided to the user.

Examples of NLP methods may include, but are not limited to, semantic approaches such as Word2Vec and Skip-Thought Vectors, and syntactic approaches such as a dependency parser, and/or a constituency parser followed by bag-of-words representation.

An example of an unsupervised machine learning technique implemented to cluster the generated feature vectors of individual text records, may include, but is not limited to, K-Means clustering. The clustering of the present disclosure, in one aspect, removes redundancy in the action space, which can occur because of overlaps in the intent of records. The clustering also keeps each action discrete, for example, so that during the ranking process, the learnt value of an action does not become diluted between alternate representations of similar actions.

In RL methodology, all these actions are ranked at every state through various statistical methods in order to determine the most rewarding action at any given instance. The highest ranked actions are recommended to the user.

Figure 1:
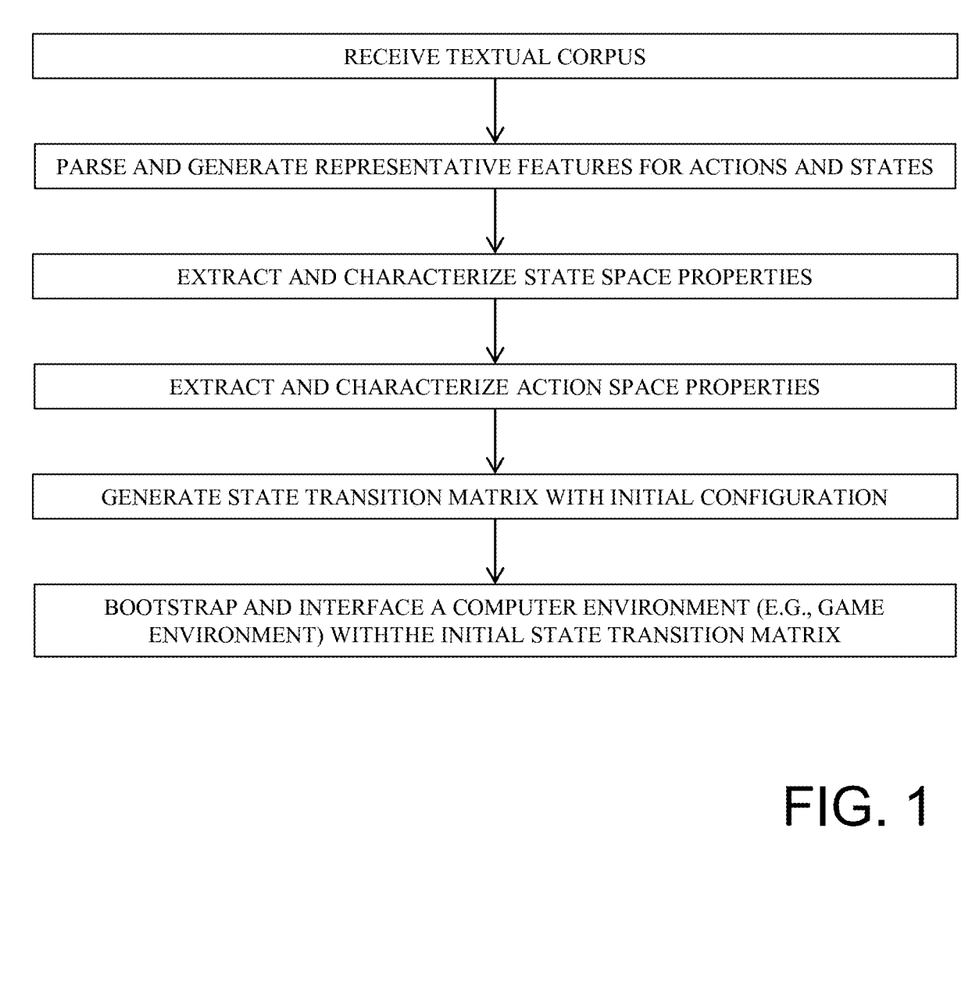
FIG. 1 is a flow diagram illustrating a method in one embodiment.

FIG. 1 is a flow diagram illustrating a method in one embodiment. The method, for instance, generates a game environment (or another computer environment) data structure from textual corpus describing rules of a game or environment. At 102, textual corpus is received. The textual corpus may include unstructured data, such as text written in natural language. In one aspect, the textual corpus need not be related to a game per se, but may include historical data relating to information or description related to reaching a goal for achieving in a computer environment.

At 104, the textual corpus is parsed to generate representative features (e.g., Resource Description Framework (RDF) triples) for actions and states, via NLP approaches. Examples of the NLP approaches may include, but are not limited to, syntactic methods such as a dependency parsing (parser) and constituency parsing (parser). A knowledge graph also referred to as RDF triples is generated from the textual corpus, to identify a state space, action space and initial state transition matrix.

At 106, state space is generated, for example, state space properties are extracted and characterized from the generated RDF triples. The following is an example of state space, for example, identified spatial properties of a game based on its rule description:

{
    Dimensions of space (e.g., 2-dimesional (2D) (8x8) for chess board)
    Additional properties of states (e.g., checkered base for chess board)
    Game reset criteria (win, lose, draw)
    Initial State
}

At 108, action space is generated, for example, action space properties are extracted and characterized from the generated RDF triples. The following is an example of action space, for example, identified spatial properties of a game based on its rule description:

{
    {
        Identify number of actions.
        Types of Actions (King, Queen, ...)
    }
}

At 110, initial configuration for state transition matrix is assigned based on the generated state space and action space properties, and a reward function. For instance, a state transition matrix is generated with initial configuration based on the state space and action space properties. In one aspect, the reward function may be inferred. In another aspect, the reward function may be received, for example, from a user. A state transition matrix, for example, includes a game state following a result of an action. An initial state transition matrix, for example, includes: {Constraints on moving a piece}.

At 112, the method may include bootstrapping and interfacing the game environment based on the state space properties, the action space properties and the initial state transition matrix.

Figure 2:
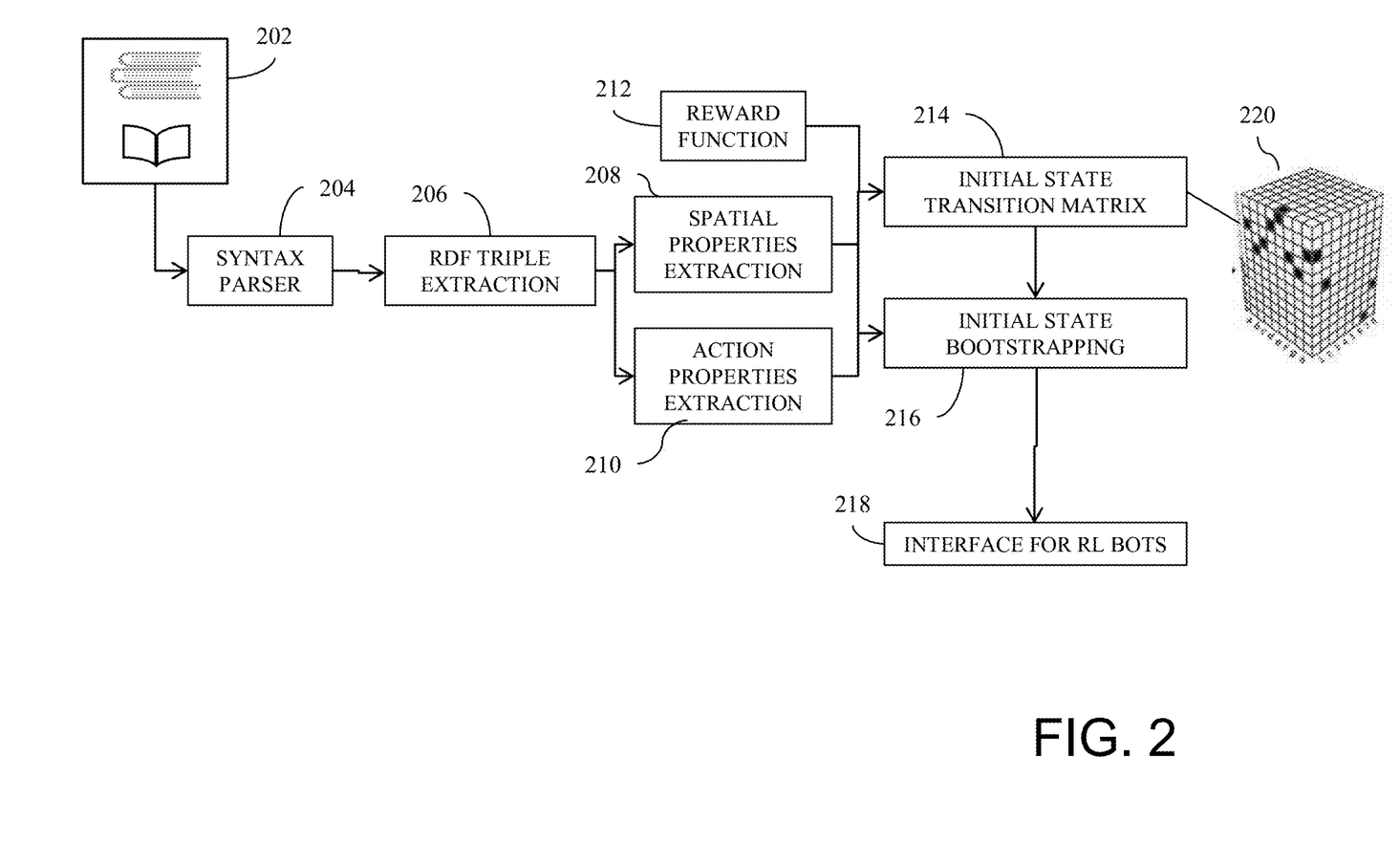
FIG. 2 is a diagram illustrating components of a system in one embodiment.

FIG. 2 is a diagram illustrating components of a system in one embodiment. Components shown in the figure may be computer-implemented or executable modules, for example, executable or running on one or more computer or hardware processors. A syntax parser 204 may parse textual corpus 202, which is received, and which may include unstructured data, such as text written in natural language. An RDF triple extraction component 206 generates representative features (e.g., Resource Description Framework (RDF) triples) for actions and states, for example, from the parsed text. In one aspect, a knowledge graph also referred to as RDF triples is generated as a result of the RDF triple extraction, to identify state space, action space and initial state transition matrix.

From the RDF triples, a spatial properties extraction component 208 extracts space or spatial properties. Similarly, from the RDF triples, an action properties extraction component 210 extracts action properties.

An initial state transition matrix 214, which includes initial configuration state is generated based on the generated state space and action space properties, and for example, a reward function 212. For instance, a state transition matrix is generated at 214 with initial configuration based on the state space and action space properties generated at 208 and 210. An example state transition matrix is shown at 220. In one aspect, the reward function may be inferred. In another aspect, the reward function may be received, for example, from a user. A state transition matrix, for example, includes a game state following a result of an action. An initial state transition matrix, for example, includes constraints on actors and actions, for example, constraints on game pieces and moving those game pieces, in a game environment.

The initial state transition matrix 214 may be bootstrapped, for example, an initial state bootstrapping component 216. The initial state bootstrapping component 216 may also interface to reinforcement learning (RL) bots or automatic agents 218. An RL bot may automatically and autonomously execute a computer-implemented game based on the initial state transition matrix.

The following shows an example of determining state space features, in one embodiment, with chess as an example game environment. The textual corpus (or game rules) may include the following, for instance, available from a public web site: "The game is played on a chessboard, consisting of 64 squares: eight rows and eight columns. The squares are alternately light (white) and dark colored. The board must be laid down such that there is a dark square in the lower-left corner. To facilitate notation of moves, all squares are given a name. From the view of the white player, the rows are numbered 1, 2, 3, 4, 5, 6, 7, 8; the lowest row has number 1, and the upper row has number 8. The columns are named, from left to right, a, b, c, d, e, f, g, h. A square gets a name, consisting of the combination of its column-letter and row-number, e.g., the square in the lower left corner (for white) is a1." The textual corpus is parsed into RDF triples of {subject, relation, object}

Figure 3:
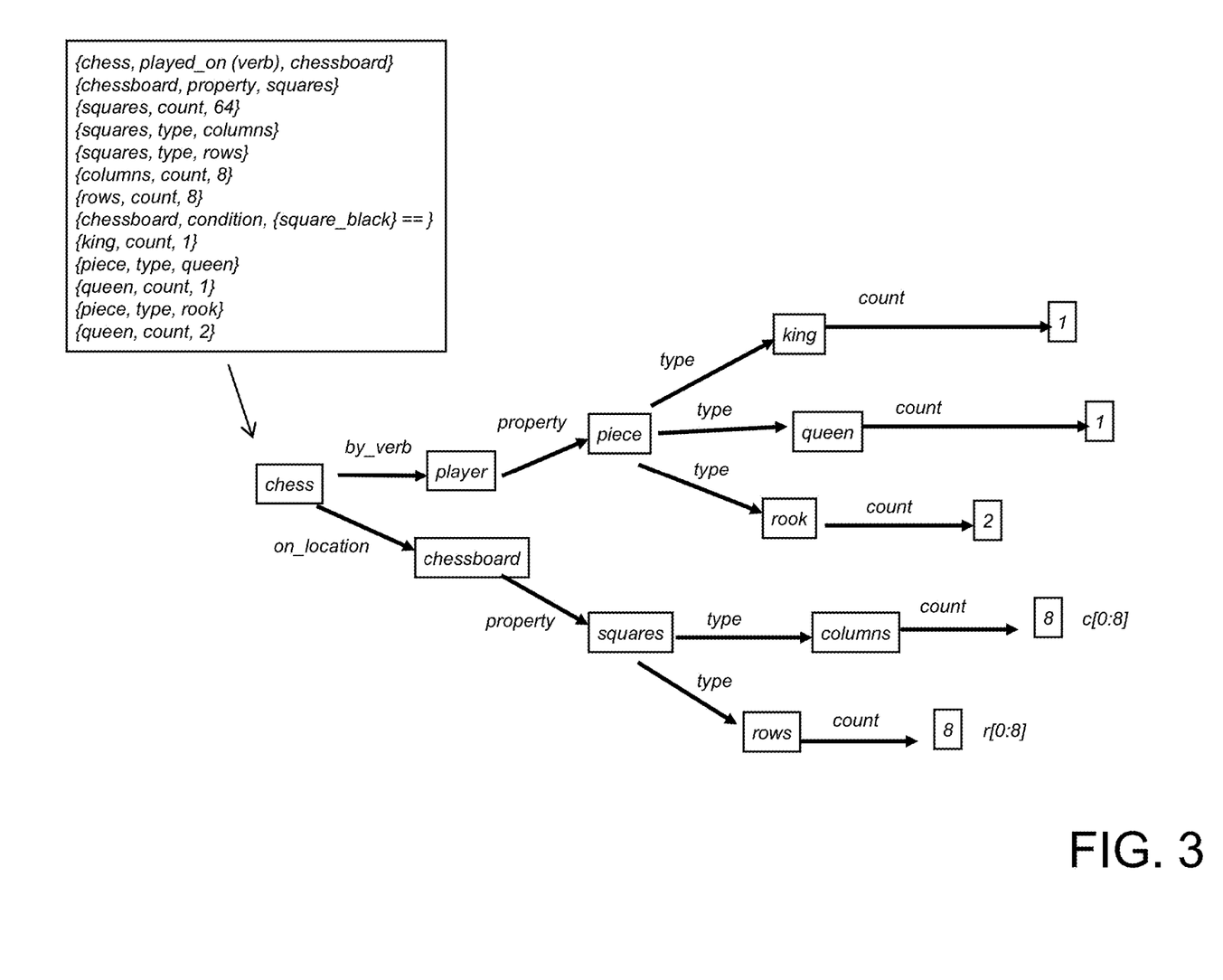
FIG. 3 shows parsed dependency relationship between words in unstructured text in one embodiment.
Figure 4:
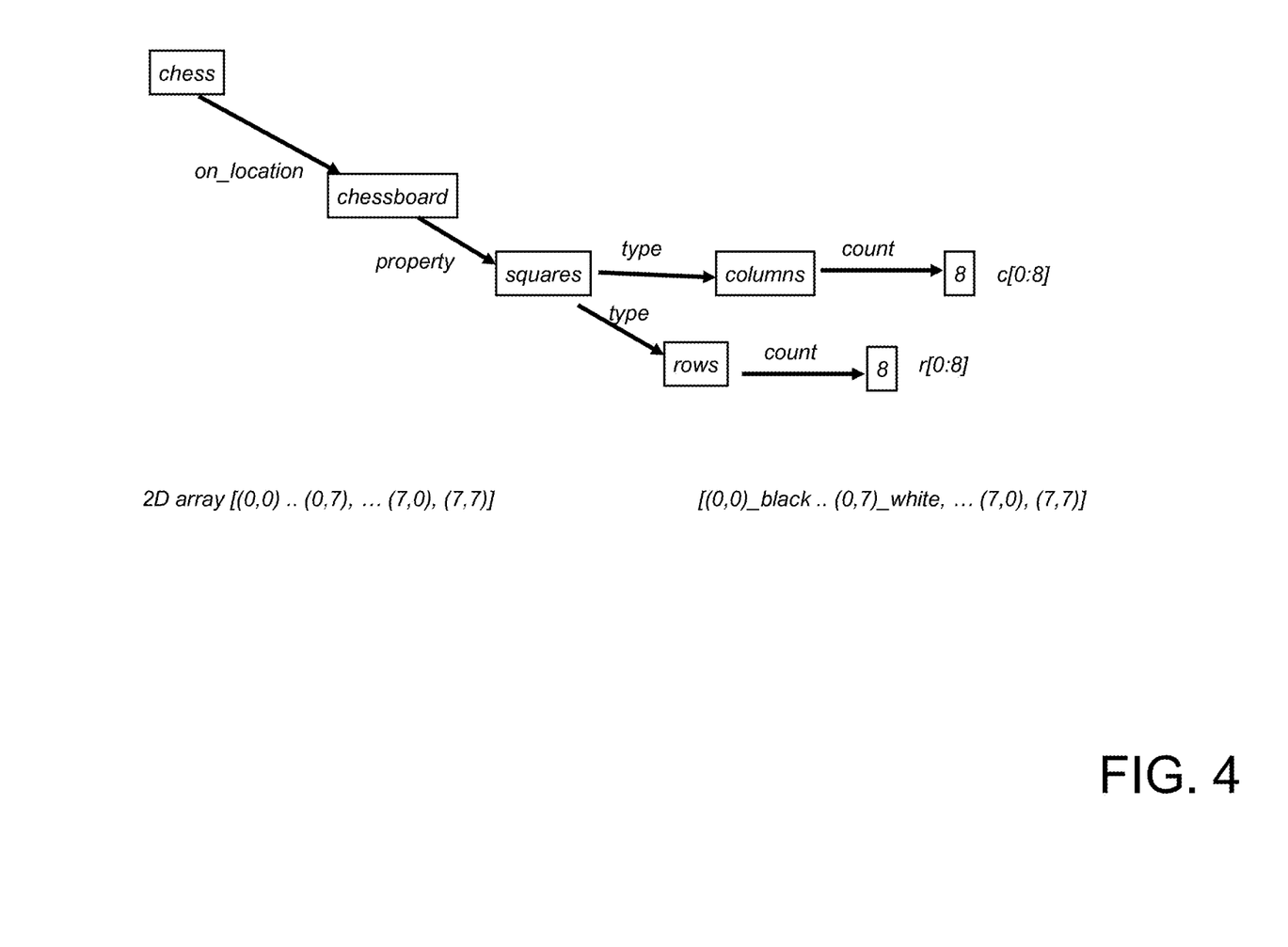
FIG. 4 shows parsed additional properties of states in one embodiment.
Figure 7:
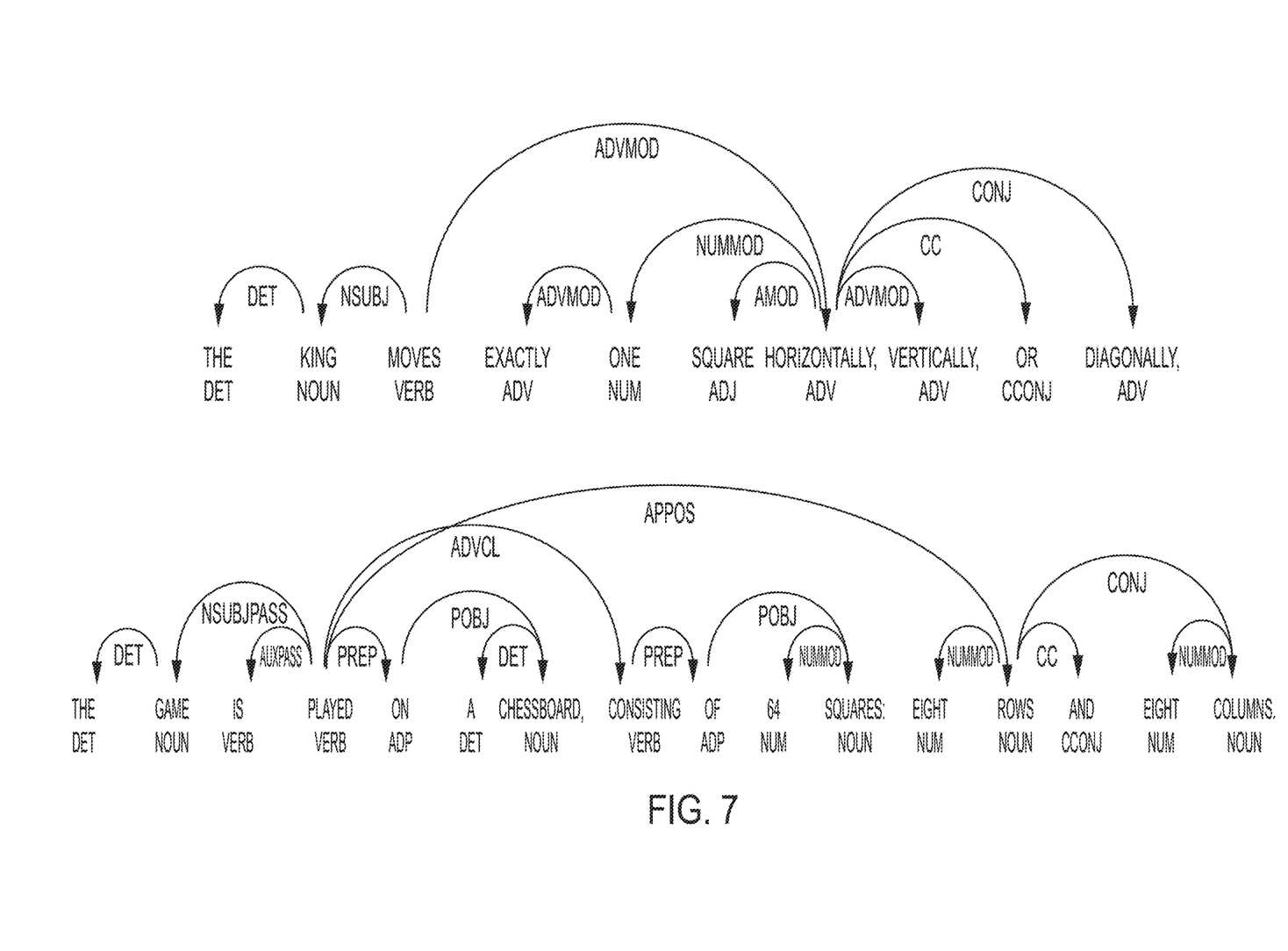
FIG. 7 shows a sample parse tree in one embodiment.

FIG. 3 shows a result of such parser in one embodiment. For instance, 302 shows examples of RDF triples generated from the above example textual corpus. The state space in this example case is the "chessboard", whose property/attribute (characterized by) is spatial "squares", of type "rows" and "columns", each "8" in numbers. This state space and its properties can be determined from text (e.g., above example game rule) using syntax parsers and using the dependency relationship between words as shown in FIG. 3. FIG. 4 shows additional properties of states in one embodiment. FIG. 7 shows a sample parse tree in one embodiment.

In one embodiment, state space determined from such text processing can be treated as a dictionary with {each state and its properties as key-value pairs}. In another aspect, such state space can be implemented as an array of dictionaries, for instance, JavaScript Object Notation (JSON) if spatial. An example is shown in Table 1.

TABLE 1

{property : 'squares'.
property_type : 'rows'.
property_type : 'columns',
state :
    {state_0 :
        {property_type : 'row',
         property_value : 0}
        {property_type : 'column',
         property_value : 0}
        {property_type : 'colour',
         Property_value : 'black'}
    ...
    }
...
}

Other data structure implementations may be employed. Generally, a method of the present disclosure identifies properties that define a state/action in state/action-space and a value associated with the state/action in state/action-space. In some embodiments, such properties are identified from the text through NLP approaches, for example, by applying rules on RDF triples from a syntactic parser.

Figure 5:
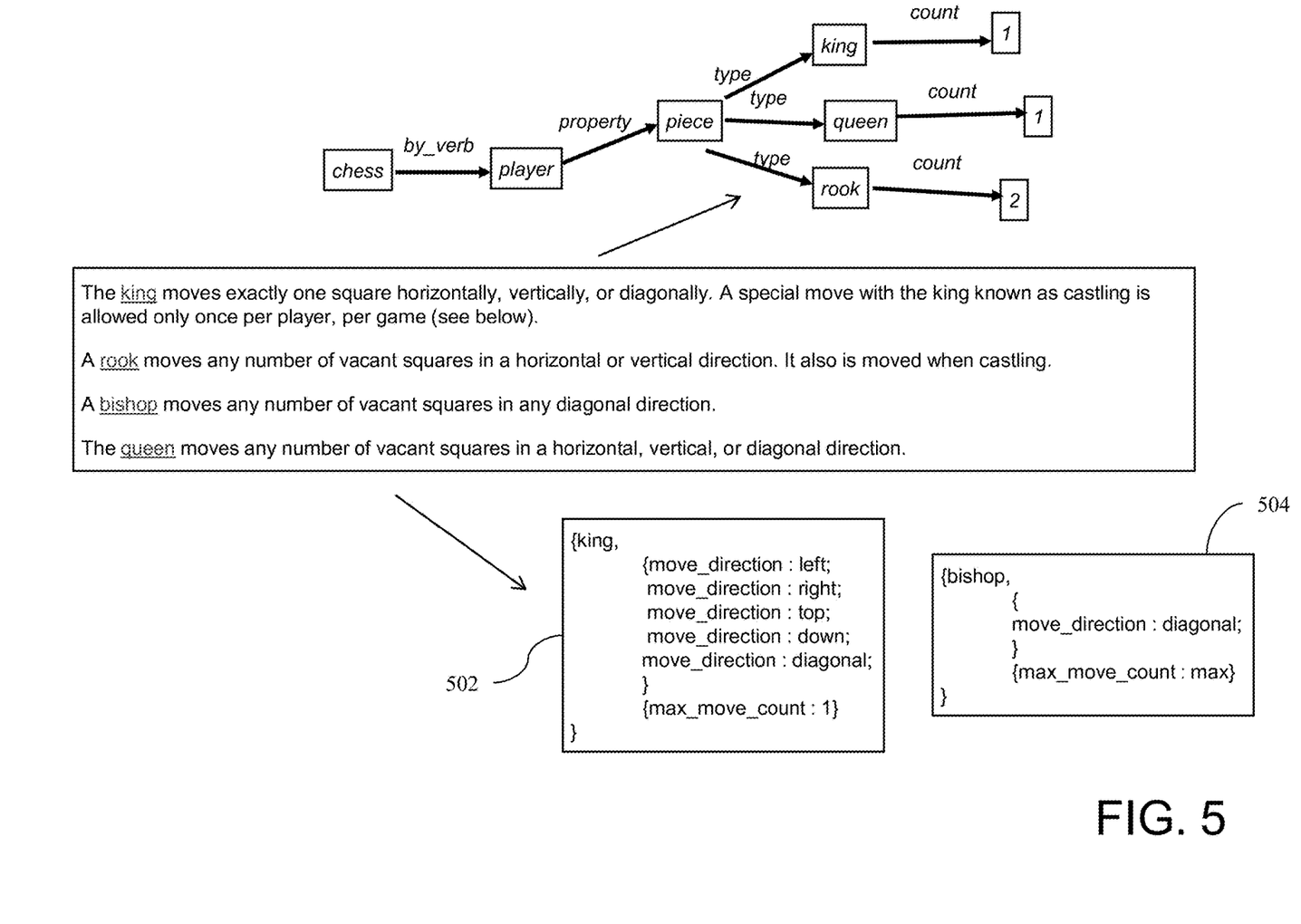
FIG. 5 shows determining action space features in one embodiment.

FIG. 5 shows determining action space features in one embodiment. The example action space features 502, 504 are parsed from the following example textual corpus: "The king moves exactly one square horizontally, vertically, or diagonally. A special move with the king known as castling is allowed only once per player, per game. A rook moves any number of vacant squares in a horizontal or vertical direction. It also is moved when castling. A bishop moves any number of vacant squares in any diagonal direction. The queen moves any number of vacant squares in a horizontal, vertical, or diagonal direction."

An example data structure of action space is shown in Table 2.

TABLE 2

{action_type : king,
  property : 'move', //Verb related, depends on the game
  params : {
      {property_value : 'horizontally',
       property_count : '1'}
      {property_value : 'vertically',
       property_count : '1'}
      ...
  }
}
{action_type: bishop,
  property : 'move'
      {property_value : 'diagonal', TABLE 2-continued property_count : 'any'}
}
}

Figure 6:
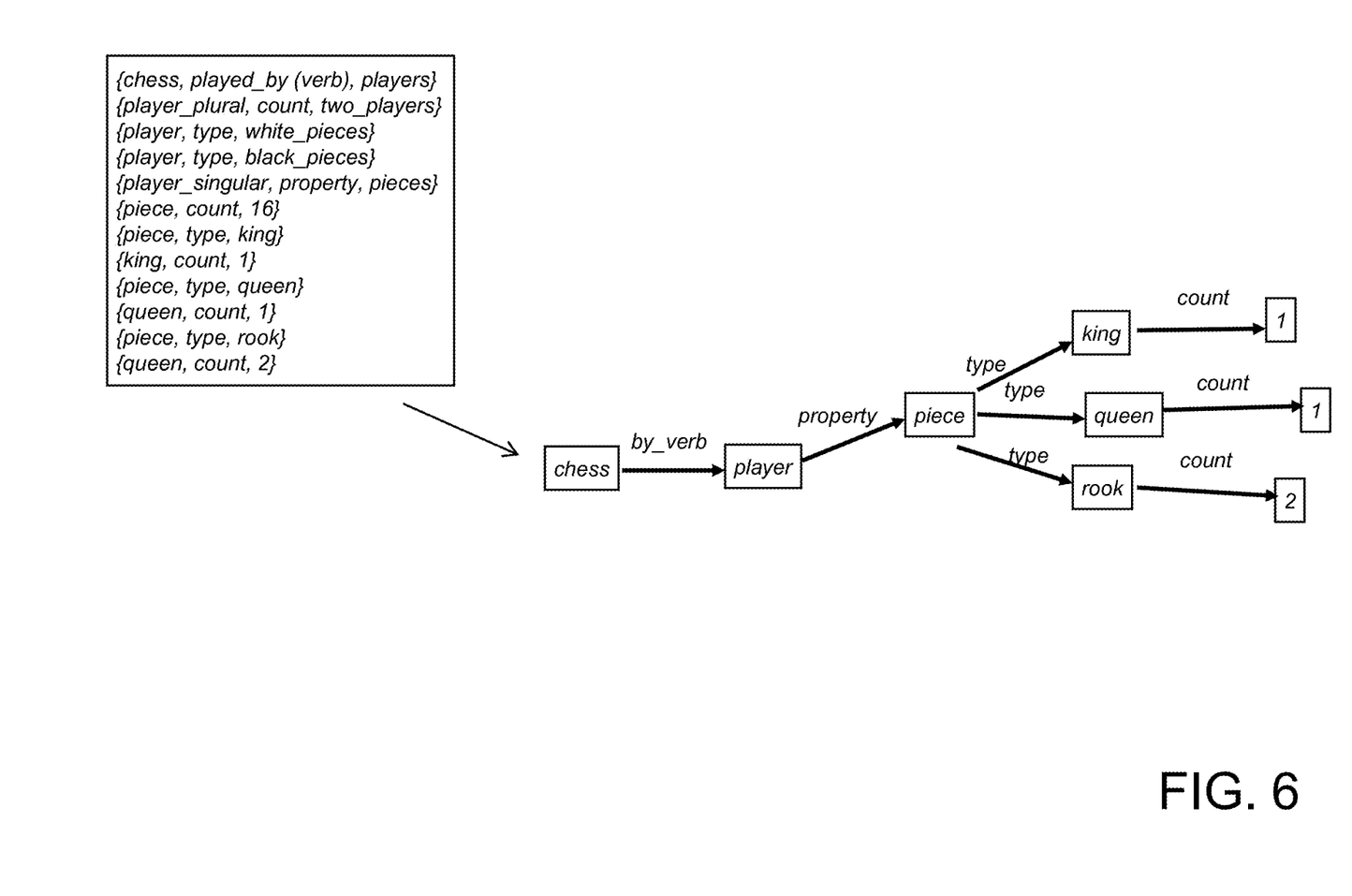
FIG. 6 shows more examples of RDF triples and extracted action space features in one embodiment.

FIG. 6 shows more examples of RDF triples and extracted action space features in one embodiment. The example RDF triples are parsed from the following textual corpus: "Chess is a game, played by two players. One player plays with the white pieces, and the other player plays with the black pieces. Each player has sixteen pieces in the beginning of the game: one king, one queen, two rooks, two bishops, two knights and eight pawns."

In one aspect, by utilizing a dependency chart (e.g., grammatical relations), it can be inferred whether the property and its values belong to an action space or state space. For instance, an action space may include verb related parameters (adverb, adverbial clause modifier (advcl), adverbial modifier (advmod): from universal dependency chart). A state space can be related to 'case' part of speech.

As shown in FIG. 3, state space (e.g., the complete state space) is identified. Generating and initializing a state transition matrix in one embodiment relates the property values of action space to the state space. For example, using the semantic relationship between the property values like 'horizontally', 'vertically', 'row', 'column' using pre-trained semantic models like Word2Vec, the property values of action space can be related to the state space. For instance, property_value='horizontally', property_count='1', property_type='row', would generate row+1 as action. In one aspect, Neural Programmers, a class of end to end deep learning models, may be employed.

In one embodiment, property values (of an action space) are used to specifically identify the resultant change in a state space, following the action. This is called a state transition function. This can be represented as an array of probabilities of dimension of State Space (8×8) for each action (e.g., King piece in bottom left corner). In one aspect, a state transition matrix includes a collection of all probabilities of new states, given the action and the current state. Technically, for an action (e.g., of a King piece), a state transition matrix is a tensor of dimensions of states. For instance, in this example, a state transition matrix is a 2-dimensional (2D) array of dimension of probabilities. Such state transition matrix can be stored as part of an action space JSON itself. Zero ("0") represents spaces to where the king piece cannot move or transition. Table 3 shows an example state transition matrix implemented as a 2D array, in which the current position of the King piece is in the bottom left corner of the table.

TABLE 3

| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 0 | 0 | 0 | 0 | 0 | 0 |
| 0 | 1 | 0 | 0 | 0 | 0 | 0 | 0 |

Some games (like Chess) may also have conditions for an action relationship. For instance, there may be 2 coins in the same state. For example, the Queen piece cannot move diagonally to the end of the board, if another piece is in the middle. To implement such conditions, in one embodiment, a data structure form that includes another dimension (third dimension) equal to the number of actions (other than dimension of state space) is may employed. For instance, an array of (8×8×32), the number 32 in the third dimension corresponding to 32 chess pieces on the chess board may be implemented. This 3-dimensional matrix is called a state transition matrix. In one embodiment, each action (chess piece) possesses this matrix. In one aspect, a process of generating initial values for this matrix, based on the semantic contextual relationship between abstracted properties (JSON) of states and actions is referred to as initializing a state transition matrix.

A reward function is a reward received for performing an action. In one aspect, a reward function depends on the game. In one aspect, a reward function may be configured manually. For example, in a game which needs to finish quickly in time, every time step can have a "−1" reward (or a penalty). In chess, as an example, there may be several reward functions. For instance, defeating the King can have a "10,000" (maximum) reward as compared to defeating a pawn which can result in a "+5" reward. As another example, a reward function may reward different pieces different rewards, e.g., pawn=1, knight=3.2, bishop=3.33, rook=5.1 and queen=8.8. In a game like chess, a reward function can be a value addition to a move. In one embodiment, a reward function can be accommodated as part of a state transition matrix. For instance, value in the matrix=function of (reward, probability value). In one aspect, for bootstrapping, this complete data structure can be stored in one system.

Figure 8:
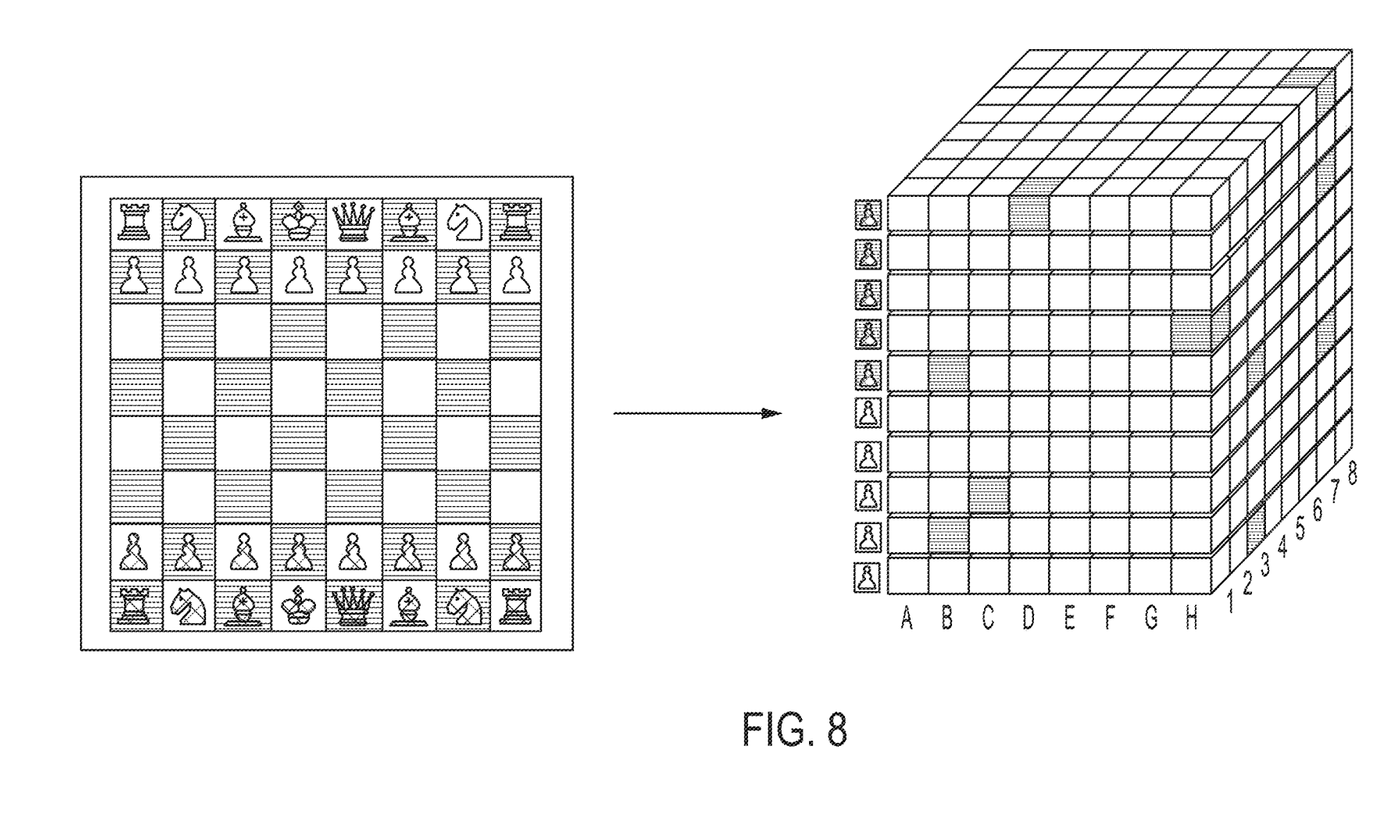
FIG. 8 shows an initial state transition matrix in one embodiment.

FIG. 8 shows an initial state transition matrix in one embodiment. This form of data structure represents the state space and action space. The relationship between the state space and action space is determined through the state transition matrix. The state transition matrix includes a change in state space following a choice of action. For instance, a piece in corner cannot move beyond the boundaries of the chess board, and therefore, the probability of "right action" for a pawn in the right extreme corner is '0'.

Figure 9:
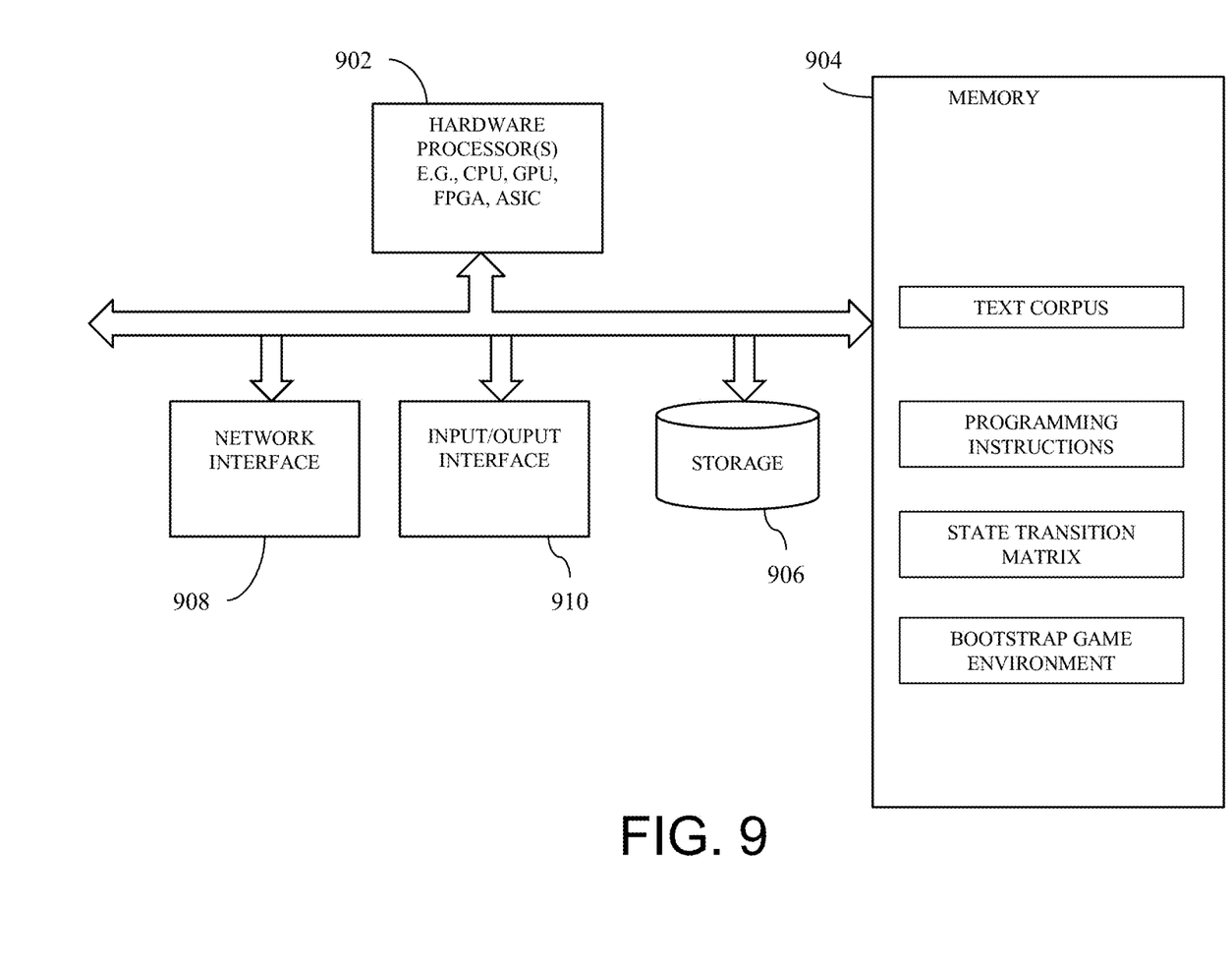
FIG. 9 is a diagram showing components of a system in one embodiment that generates game environments from unstructured textual corpus for reinforcement learning.

FIG. 9 is a diagram showing components of a system in one embodiment that generates game environments from unstructured textual corpus for reinforcement learning. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and generate representative features for actions and states (e.g., RDF triples), generate state transition matrix with initial configuration, and bootstrap a computer environment such as a game environment. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 904 may, for example, store instructions and/or data for functioning of the one or more hardware processors 902, and may include an operating system and other program of instructions and/or data. The one or more hardware processors 902 may receive input comprising chat space conversation data. For instance, at least one hardware processor 902 may generate a state transition matrix with initial configuration. In one aspect, text corpus describing, for instance, the rules of the game may be stored in a storage device 906 or received via a network interface 908 from a remote device, and may be temporarily loaded into the memory device 904 for generating the RDF triples and state transition matrix. The state transition matrix may be stored on memory 904, for example, for bootstrapping a game environment executing in one or more hardware processors 902. The one or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
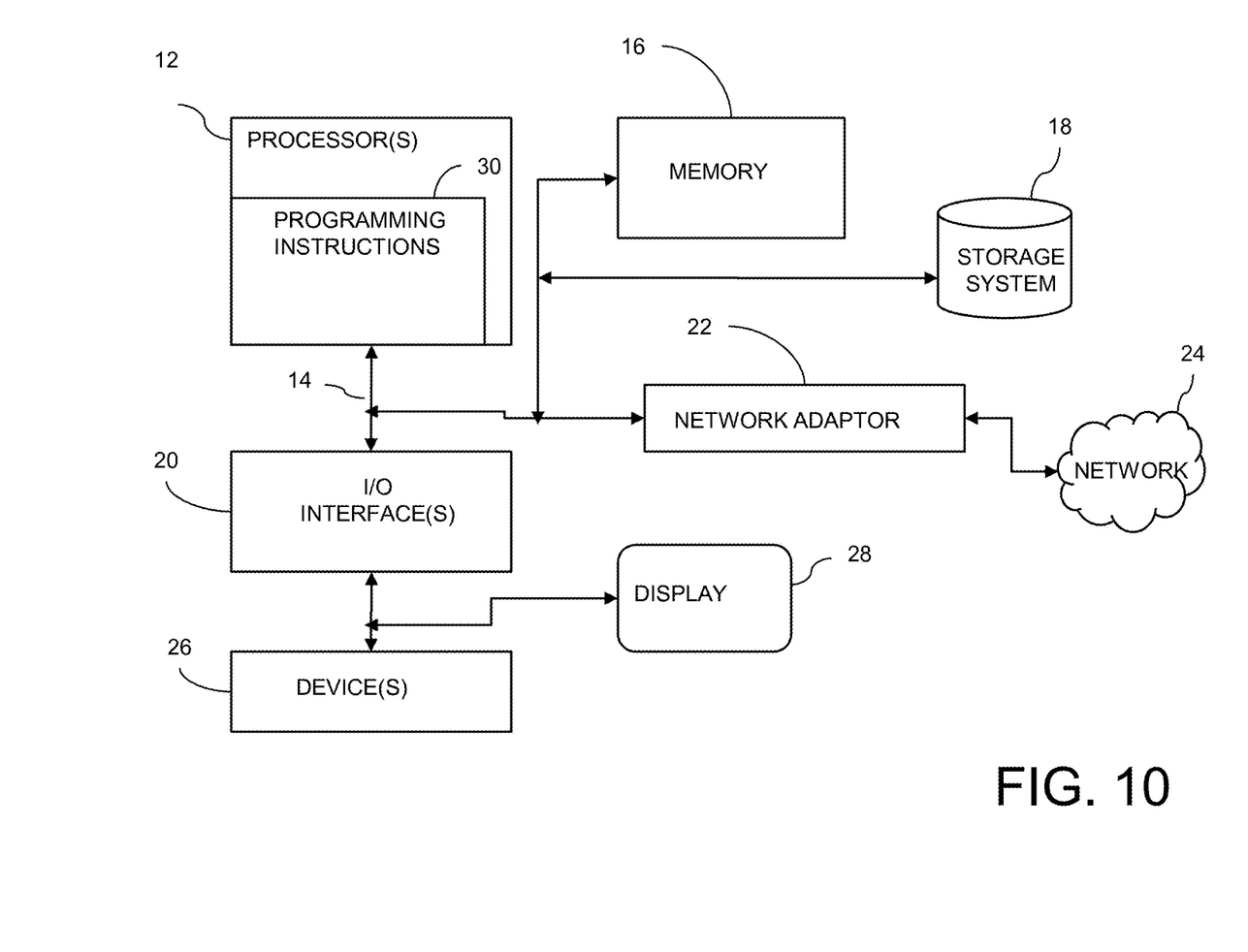
FIG. 10 illustrates a schematic of an example computer or processing system that may implement a system according to one embodiment.

FIG. 10 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A computer-implemented method comprising:
   receiving text corpus comprising unstructured natural language data;
   generating representative features representing actions and states described in the text corpus, wherein the representative features representing the actions are clustered into clusters using an unsupervised machine learning technique, wherein a representative action and an action identifier is assigned to a cluster in the clusters, wherein the action identifier represents a unique action;
   extracting and characterizing state properties associated with the states from the representative features;
   extracting and characterizing action properties associated with the actions from the representative features;
   generating a state transition matrix with initial configurations based on the state space and action space properties; and
   bootstrapping a computer environment based on the state space, the action space and the initial state transition matrix.

2. The method of claim 1, wherein the state transition matrix is generated further based on a reward function.

3. The method of claim 2, wherein the reward function is received from a user.

4. The method of claim 2, wherein the reward function is automatically inferred.

5. The method of claim 1, wherein the computer environment comprises a computer video game environment and the unstructured natural language data comprises rules describing a computer video game played in the computer video game environment.

6. The method of claim 1, wherein the computer video game environment runs a reinforcement learning technique to play the computer video game automatically based on the generated state transition matrix, the state properties and the action properties.

7. A computer readable storage medium storing a program of instructions executable by a machine to perform a method comprising:
   receiving text corpus comprising unstructured natural language data;
   generating representative features representing actions and states described in the text corpus, wherein the representative features representing the actions are clustered into clusters using an unsupervised machine learning technique, wherein a representative action and an action identifier is assigned to a cluster in the clusters, wherein the action identifier represents a unique action;
   extracting and characterizing state properties associated with the states from the representative features;
   extracting and characterizing action properties associated with the actions from the representative features;
   generating a state transition matrix with initial configurations based on the state space and action space properties; and
   bootstrapping a computer environment based on the state space, the action space and the initial state transition matrix.

8. The computer readable storage medium of claim 7, wherein the state transition matrix is generated further based on a reward function.

9. The computer readable storage medium of claim 8, wherein the reward function is received from a user.

10. The computer readable storage medium of claim 8, wherein the reward function is automatically inferred.

11. The computer readable storage medium of claim 7, wherein the computer environment comprises a computer video game environment and the unstructured natural language data comprises rules describing a computer video game played in the computer video game environment.

12. The computer readable storage medium of claim 7, wherein the computer video game environment runs a reinforcement learning technique to play the computer video game automatically based on the generated state transition matrix, the state properties and the action properties.

13. A system, comprising:
a hardware processor coupled with a memory device, the hardware processor operable to at least:
    receive text corpus comprising unstructured natural language data;
    generate representative features representing actions and states described in the text corpus, wherein the representative features representing the actions are clustered into clusters using an unsupervised machine learning technique, wherein a representative action and an action identifier is assigned to a cluster in the clusters, wherein the action identifier represents a unique action;
    extract and characterizing state properties associated with the states from the representative features;
    extract and characterize action properties associated with the actions from the representative features;
    generate a state transition matrix with initial configurations based on the state space and action space properties; and
    bootstrap a computer environment based on the state space, the action space and the initial state transition matrix.

14. The system of claim 13, wherein the state transition matrix is generated further based on a reward function.

15. The system of claim 14, wherein the reward function is received from a user.

16. The system of claim 14, wherein the reward function is automatically inferred.

17. The system of claim 13, wherein the computer environment comprises a computer video game environment and the unstructured natural language data comprises rules describing a computer video game played in the computer video game environment.

18. The system of claim 13, wherein the computer video game environment runs a reinforcement learning technique to play the computer video game automatically based on the generated state transition matrix, the state properties and the action properties.

* * * * *